(12) United States Patent
Kim

(10) Patent No.: US 9,023,516 B2
(45) Date of Patent: May 5, 2015

(54) RECHARGEABLE BATTERY AND MODULE THEREOF

(75) Inventor: Duk-Jung Kim, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 338 days.

(21) Appl. No.: 13/428,390

(22) Filed: Mar. 23, 2012

(65) Prior Publication Data
US 2013/0065100 A1 Mar. 14, 2013

(30) Foreign Application Priority Data
Sep. 9, 2011 (KR) .................. 10-2011-0092153

(51) Int. Cl.
| H01M 2/12 | (2006.01) |
| H01M 2/02 | (2006.01) |
| H01M 2/06 | (2006.01) |
| H01M 2/00 | (2006.01) |
| H01M 2/30 | (2006.01) |
| H01M 2/10 | (2006.01) |
| H01M 2/04 | (2006.01) |

(52) U.S. Cl.
CPC .......... *H01M 2/1061* (2013.01); *H01M 2/1235* (2013.01); *H01M 2/04* (2013.01); *H01M 2/0473* (2013.01); *H01M 2/0482* (2013.01); *H01M 2/0217* (2013.01); *H01M 2/0404* (2013.01); *H01M 2/06* (2013.01); *H01M 2/1252* (2013.01); *H01M 2/30* (2013.01)

(58) Field of Classification Search
None
See application file for complete search history.

(56) References Cited

U.S. PATENT DOCUMENTS

| 4,008,354 | A  | * | 2/1977 | Fitchman et al. | ............... | 429/56 |
| 5,766,790 | A  |   | 6/1998 | Kameishi et al. | | |
| 6,278,259 | B1 | * | 8/2001 | Kimoto et al. | ............... | 320/147 |
| 8,236,439 | B2 |   | 8/2012 | Byun et al. | | |
| 2008/0213657 | A1 | | 9/2008 | Qi et al. | | |
| 2010/0167107 | A1 | * | 7/2010 | Byun et al. | ...................... | 429/56 |
| 2011/0039136 | A1 | * | 2/2011 | Byun et al. | ...................... | 429/56 |
| 2011/0052949 | A1 | | 3/2011 | Byun et al. | | |
| 2013/0059197 | A1 | * | 3/2013 | Huang | ........................... | 429/178 |

FOREIGN PATENT DOCUMENTS

| JP | 08-293301 | 11/1996 |
| JP | 2001-110377 | 4/2001 |
| JP | 2002-008603 | 1/2002 |
| JP | 2011-54561 | 3/2011 |
| KR | 10-2007-0122471 | 12/2007 |
| KR | 10-2011-0017820 | 2/2011 |

* cited by examiner

*Primary Examiner* — Ula C. Ruddock
*Assistant Examiner* — Matthew Van Oudenaren
(74) *Attorney, Agent, or Firm* — Lee & Morse, P.C.

(57) ABSTRACT

A rechargeable battery includes an electrode assembly including electrodes both sides of a separator; a case accommodating the electrode assembly; a cap plate coupled to an opening of the case; an electrode terminal assembled to a terminal hole of the cap plate; an insulator between the electrode terminal and a first surface of the cap plate; a gasket between the electrode terminal and a second surface of the cap plate; and a lead tab at one side of the gasket to connect the electrode terminals to the electrode assembly. The electrode terminal and the cap plate form a vent hole that penetrates the electrode terminal and the cap plate, and the vent hole is sealed by a vent plate.

16 Claims, 7 Drawing Sheets

RECHARGEABLE BATTERY AND MODULE THEREOF

BACKGROUND

1. Field

The described technology relates generally to a rechargeable battery having an electrode terminal and a vent hole, and a module thereof.

2. Description of the Related Art

A rechargeable battery, unlike a primary battery, repeatedly performs charging and discharging. A small-capacity rechargeable battery is used in a portable small-sized electronic device such as a mobile phone, a notebook computer, and a camcorder and a large-capacity rechargeable battery may be used as a power supply for driving a motor such as a hybrid vehicle.

For example, the rechargeable battery includes an electrode assembly provided with electrodes at both sides of a separator, a case receiving the electrode assembly, a cap plate coupled to an opening of the case, and electrode terminals provided in the cap plate and connected to the electrodes through lead tabs.

The above information disclosed in this Background section is only for enhancement of understanding of the background of the described technology and therefore it may contain information that does not form the prior art that is already known in this country to a person of ordinary skill in the art.

SUMMARY

According to an embodiment, there is provided a rechargeable battery including an electrode assembly including electrodes on both sides of a separator, a case accommodating the electrode assembly, a cap plate coupled to an opening of the case, an electrode terminal assembled to a terminal hole of the cap plate, an insulator between the electrode terminal and a first surface of the cap plate, a gasket between the electrode terminal and a second surface of the cap plate, and a lead tab at one side of the gasket to connect the electrode terminal to the electrode assembly, wherein the electrode terminal and the cap plate include a vent hole that penetrates the electrode terminal and the cap plate, and the vent hole is sealed by a vent plate.

The electrode terminal may include a plate terminal at an outer surface of the insulator and a rivet terminal connected to the plate terminal and connected to the lead tab through the terminal hole.

The electrode terminal may further include a bolt terminal passing through a bolt hole of the plate terminal and having a protrusion at an outer side of the bolt terminal, the bolt terminal being coupled to a groove formed in the plate terminal corresponding to the protrusion such that the bolt terminal is supported by the insulator, the insulator being between the bolt terminal and the cap plate.

The rechargeable battery may further include a support plate between the gasket and the lead tab.

The terminal hole may include a plurality of terminal holes in the cap plate. The support plate may include a plurality of a rivet holes corresponding to the terminal holes.

The terminal holes include, in a first direction of the cap plate, a first terminal hole in the cap plate corresponding to a first side portion of the plate terminal, a second terminal hole in the cap plate corresponding to a center portion of the plate terminal, and a third terminal hole corresponding to second side portion of the plate terminal on an opposite side of the plate terminal from the first side portion. The rivet terminal may include a first rivet inserted to the first terminal hole, a second rivet separated from the first rivet and inserted to the second terminal hole, and a third rivet separated from the second rivet and inserted to the third terminal hole.

The bolt terminal may be disposed between the first rivet and the second rivet.

The vent hole may be disposed between the second rivet and the third rivet.

A diameter of the first rivet may be larger than diameters of the second and third rivets.

The first rivet and the second rivet may be singular rivets, and the third rivet may include two third rivets separated in a second direction that crosses the first direction of the cap plate.

The vent hole may include a first vent hole in the cap plate and a second vent hole in the electrode terminal and connected to the first vent hole.

The rechargeable battery may further include a support plate between the gasket and the lead tab. The vent hole may further include a third vent hole formed in the support plate and connected to the first vent hole.

The vent plate may be welded to a groove located in an external circumference of the first vent hole between the first and third vent holes to control a connection between the first vent hole and the third vent hole.

A diameter of the first vent hole may be smaller than a diameter of the second vent hole.

A diameter of the first vent hole may be smaller than a diameter of the third vent hole. The vent plate may be supported by the support plate, the gasket being interposed therebetween.

The rechargeable battery may further include an exhaust pipe inserted to the second vent hole.

The exhaust pipe may include a protrusion at an end thereof. The protrusion may be supported by the cap plate and the plate terminal in an outer side of the first vent hole.

The exhaust pipe may be formed of at least one of rubber, a synthetic resin, and metal.

According to an embodiment, there is provided a battery module including a housing receiving a plurality of electrically connected rechargeable batteries, a plurality of sub-exhaust pipes connected to vent holes of the respective rechargeable batteries received in the housing, and a main exhaust pipe connecting the sub-exhaust pipes.

The main exhaust may include an opening in at least one end thereof. The opening may be disposed outside an outermost portion of the housing.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
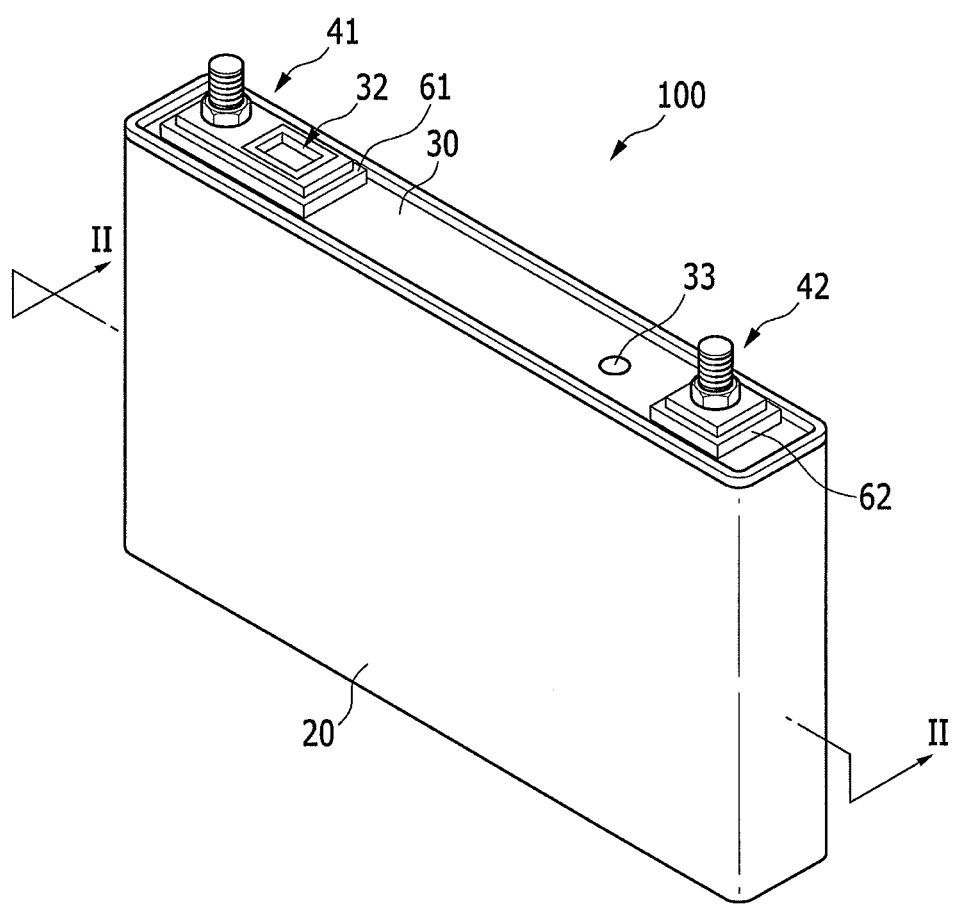
FIG. 1 illustrates a perspective view of a rechargeable battery according to an exemplary embodiment.

Korean Patent Application No. 10-2011-0092153, filed on Sep. 9, 2011, in the Korean Intellectual Property Office, and entitled: "Rechargeable Battery and Module Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, dimensions may be exaggerated for clarity of illustration. Like reference numerals refer to like elements throughout.

Figure 2:
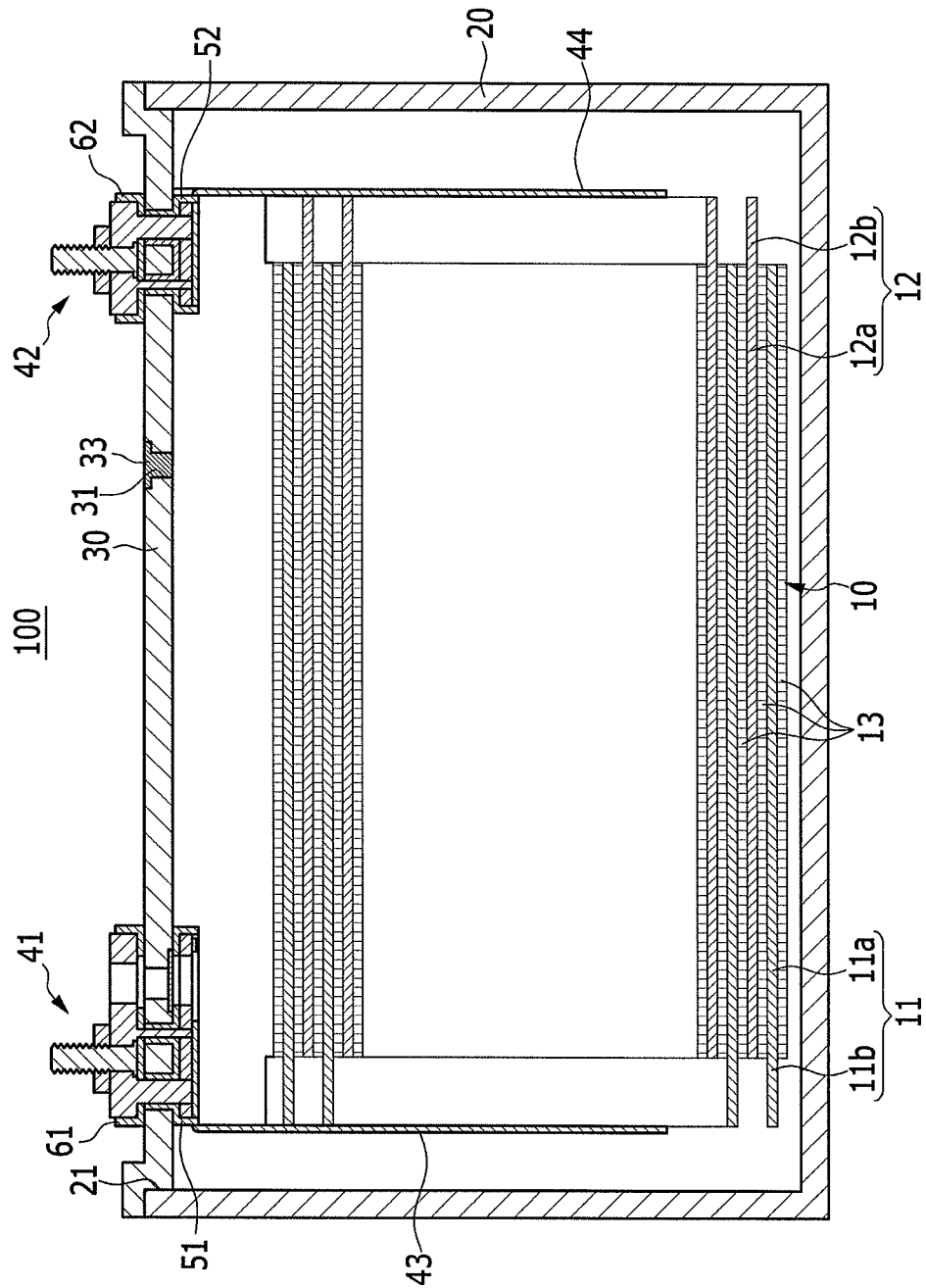
FIG. 2 illustrates a cross-sectional view of FIG. 1, taken along the line II-II.

FIG. 1 is a perspective view of a rechargeable battery 100 according to an exemplary embodiment. FIG. 2 is a cross-sectional view of FIG. 1, taken along the line II-II. Referring to FIG. 1 and FIG. 2, the rechargeable battery 100 according to the exemplary embodiment may include an electrode assembly 10 repetitively performing charging and discharging, a case 20 accommodating the electrode assembly 10 and an electrolyte solution, a cap plate 30 coupled to an opening of the case 20, and electrode terminals (i.e., negative and positive electrode terminals 41 and 42) provided in the cap plate 30.

The rechargeable battery 100 may further include insulators 61 and 62 disposed between the negative and positive electrode terminals 41 and 42 and a first surface (outer surface) of the cap plate 30 for electric insulation therebetween and gaskets 51 and 52 disposed between the negative and positive electrode terminals 41 and 42 and a second surface (inner surface) of the cap plate 30 for electric insulation and sealing therebetween.

For example, the electrode assembly 10 may include electrodes, for example, a negative electrode 11 and a positive electrode 12 disposed at both sides of a separator 13, which is an electric insulator, and may be formed by winding the negative electrode 11, the separator 13, and the positive electrode 12 in a jelly roll state.

The electrode assembly may be assembled by layering the negative electrode 11 and the positive electrode 12, respectively formed of a single plate, interposing the separator 13 therebetween, or may be assembled by layering the negative electrode, the separator, and the positive electrode bent in the shape of a zigzag (not shown).

The negative and positive electrodes 11 and 12 may include coated regions 11a and 12a formed by coating an active material (not shown) on a current collector and uncoated regions 11b and 12b formed as an exposed portion of the current collector that is not coated with the active material at one side of each of the coated regions 11a and 12a. As examples, the current collector of the negative electrode 11 may be formed of a copper thin film and the current collector of the positive electrode 12 may be formed of an aluminum thin film.

The uncoated region 11b of the negative electrode 11 may be formed at one end of the negative electrode 11 along the coated region 11a of the wound negative electrode 11. The uncoated region 12b of the positive electrode 12 may be formed at one end of the positive electrode 2 along the coated region 12a of the wound positive electrode 12. That is, the uncoated regions 11b and 12b may be respectively disposed at lateral ends of the electrode assembly 10 for electric connection with the negative and positive electrodes 41 and 42.

The case 20 may include an opening 21 at one side thereof, and thus may enable insertion of the electrode assembly 10 through the opening 21. Further, the case 20 may be formed in the shape of a cubiod having a space for receiving an electrolyte solution.

The cap plate 30 may be coupled to the opening 21 of the case 20 and may define a receiving space sealed in an air tight manner with the case 20. As examples, the case 20 and the cap plate 30 may be formed of aluminum. Be being formed of a same material, the case 20 and the cap plate may have excellent welding characteristics when they are coupled and then welded to each other. The cap plate 30 may include an electrolyte injection opening 31 and a vent hole 32. The electrolyte injection opening 31 may enable injection of the electrolyte solution into the case 20 after the cap plate 30 is coupled to the case 20. After the injection of the electrolyte solution, the electrolyte injection opening 31 may be sealed by a sealing cap 33.

Figure 3:
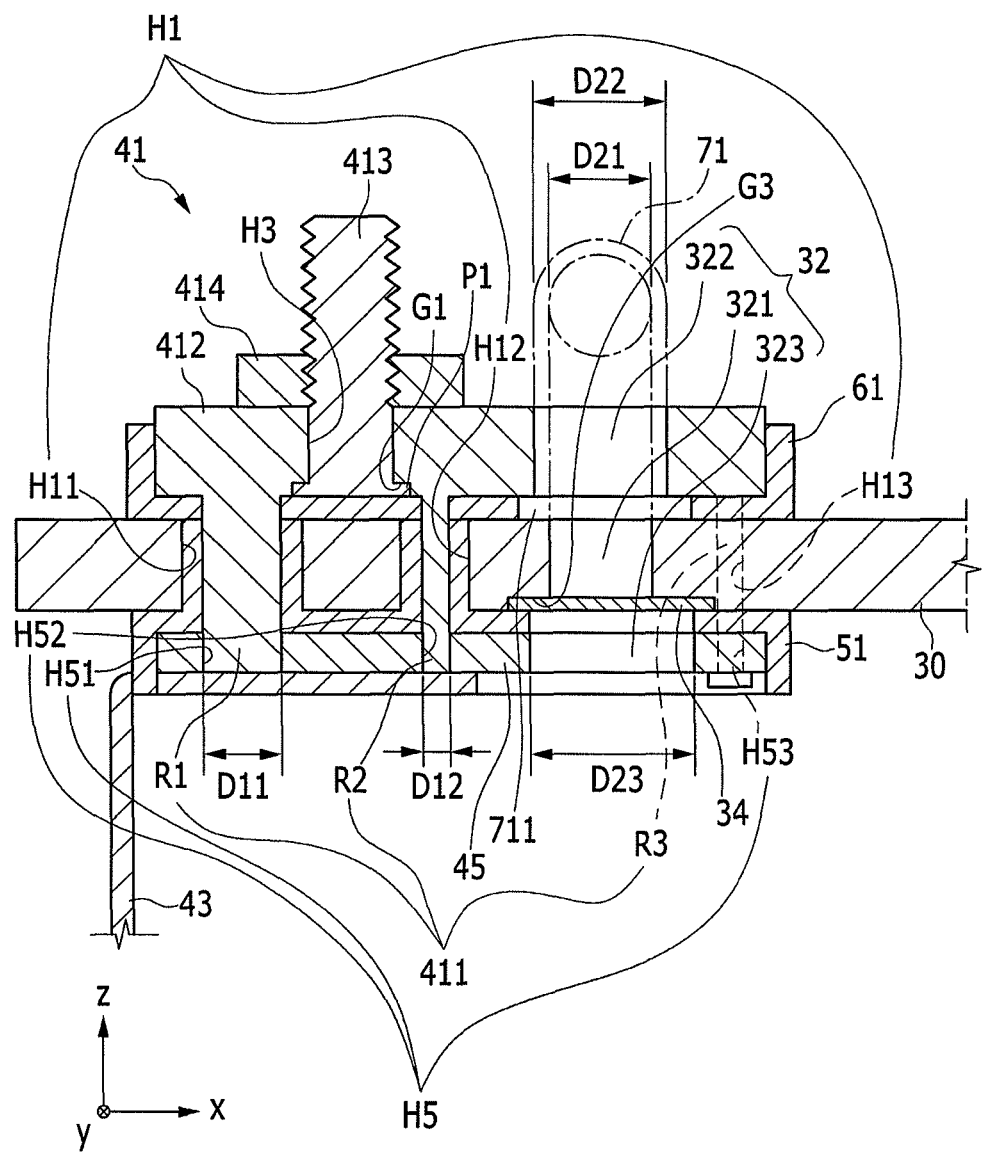
FIG. 3 illustrates a detailed cross-sectional view of an assembling portion of a cap plate and a negative electrode terminal.
Figure 4:
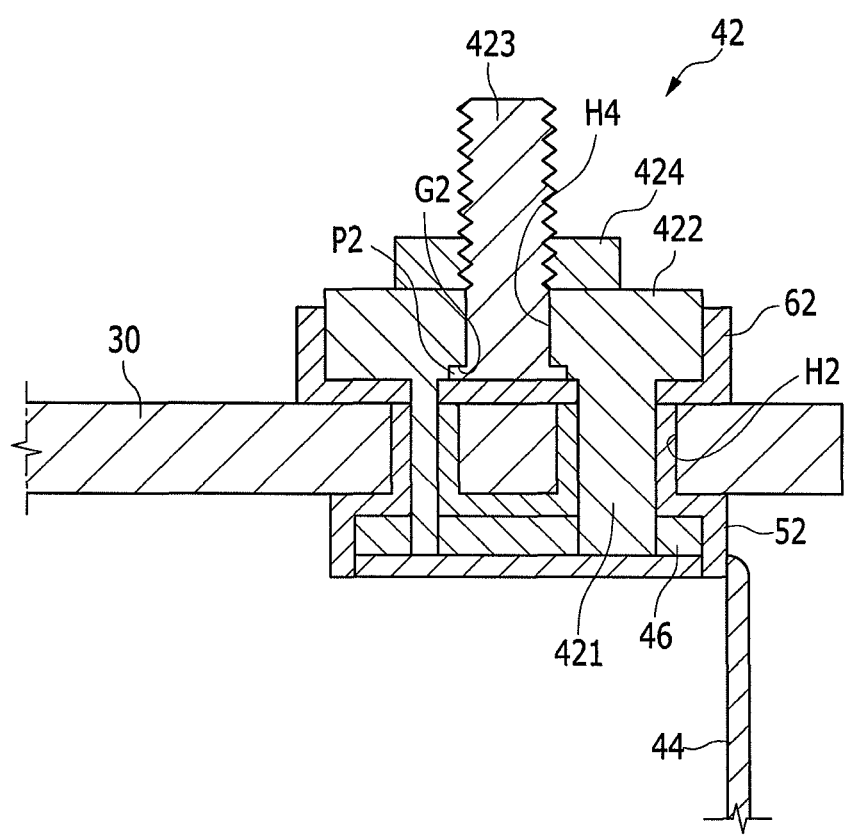
FIG. 4 illustrates a detailed cross-sectional view of an assembling portion of a cap plate and a positive electrode terminal.

The cap plate 30 may include terminal holes H1 and H2 for electric connection between the inside and the outside of the case 20 (refer to FIG. 3 and FIG. 4). The electrode terminals, that is, the negative and positive terminals 41 and 42 may be respectively provided in the terminal holes H1 and H2 and thus connected to the electrode assembly 10 through lead tabs, that is, negative and positive electrode lead tabs 43 and 44.

The negative electrode terminal 41 may be connected to the negative electrode 11 of the electrode assembly 10 through the negative electrode lead tab 43 having conductivity, and the positive electrode terminal 42 may be connected to the positive electrode 12 of the electrode assembly 10 through the positive electrode lead tab 44 having conductivity.

FIG. 3 is a detailed cross-sectional view of the assembled portion of the cap plate 30 and the negative electrode terminal 41. FIG. 4 is detailed cross-sectional view of the assembled portion of the cap plate 30 and the positive electrode terminal 42.

Referring to FIG. 3 and FIG. 4, the negative and positive electrode terminals 41 and 42 may include plate terminals 412 and 422 and rivet terminals 411 and 421 formed integrally to the plate terminals 412 and 422. The rivet terminals 411 and 421 may be inserted to the terminal holes H1 and H2 of the cap plate 30 and thus may extend to the inner side and the outer side of the cap plate 30.

Further, the negative and positive electrode terminals terminal 41 and 42 may include bolt terminals 413 and 413 inserted into bolt holes H3 and H4 of the plate terminals 412 and 422 and thus protruding to the outside of the plate terminals 412 and 422.

The bolt terminals 413 and 423 may include protrusions P1 and P2. The bolt terminals 413 and 423 may contact and be coupled to grooves G1 and G2 formed corresponding to the outer side of the bolt holes H3 and H4 in the plate terminals 412 and 422 through the protrusions P1 and P2. The protrusions P1 and P2 may be fixed between the plate terminals 412 and 422 and insulators 61 and 62.

The bolt terminals 413 and 423 may be fixed to the bolt holes H3 and H4 while being supported by the cap plate 30, and may be firmly fastened to the plate terminals 412 and 422 by the elasticity of the insulators 61 and 62.

In addition, the bolt terminals 413 and 423 may be fixed to the plate terminals 411 and 421 by being fastened by nuts 414 and 424. The bolt terminals 413 and 423 may penetrate bus bars (not shown) disposed on the nuts 414 and 424 and thus may be fastened with nuts (not shown) disposed on the bus bars so that a parallel or serial connection with neighboring rechargeable batteries (not shown) through the bur bars may be obtained.

The negative and positive electrode terminals 41 and 42 and the negative and positive electrode lead tabs 43 and 44 may be electrically connected with each other respectively in the cap plate 30 through support plates 45 and 46.

That is, the support plates 45 and 46 may be electrically and mechanically connected to the rivet terminals 411 and 421 by fitting the support plates 45 and 46 to lower portions of the rivet terminals 411 and 421 and caulking the lower portions of the rivet terminals 411 and 421.

The negative and positive electrode lead tabs 43 and 44 may be electrically connected to the support plates 45 and 46 and the rivet terminals 411 and 421 by being welded to the lower portions of the rivet terminals 411 and 421 and the support plates 45 and 46. Thus, the support plates 45 and 46 formed in the shape of a flat plane may connect the rivet terminals 411 and 421 and the negative and positive lead tabs 43 and 44 to both sides for stable and rigid connection structure therebetween.

Gaskets 51 and 52 may be provided between the negative and positive electrode terminals 41 and 42 and the terminal holes H1 and H2. That is, the gaskets 51 and 52 may be provided between the external circumferential surfaces of the rivet terminals 411 and 421 and the interior circumferential surfaces of the terminal holes H1 and H2 for sealing and electrical insulation between the rivet terminals 411 and 421 and the terminal holes H1 and H2.

The support plates 45 and 46 may support the gaskets 51 and 52. Accordingly, the insulation and sealing structure of the gaskets 51 and 52 may be stable. The support plates 45 and 46 may have non-bending characteristics, and therefore may stably press the gaskets 51 and 52. Thus, the gaskets 51 and 52 may have excellent sealing and insulation characteristics.

Further, the gaskets 51 and 52 may electrically insulate the negative and positive electrode lead tabs 43 and 44, the support plates 45 and 46, and the rivet terminals 411 and 421 with respect to the cap plate 30. That is, the gaskets 51 and 52 may electrically insulate the second surface (inner surface) of the cap plate 30, the support plates 45 and 46, and the negative and positive electrode lead tabs 43 and 44 in the inner side of the cap plate 30.

When the support plate is not used, the gasket may electrically insulate the inner surface of the cap plate and the negative and positive electrode lead tabs in the inner side of the cap plate (not shown). In this case, the negative and positive electrode lead tabs may be directly connected to the rivet terminals.

The insulators 61 and 62 may be provided between the cap plate 3 and the negative and positive electrode terminals 41 and 42 on the opposite side of the gaskets 51 and 52, interposing the cap plate 30 therebetween. That is, the insulators 61 and 62 may be provided between the second surface (outer surface) of the cap plate 3 and the bottom sides of the plate terminals 412 and 422 for electric insulation between the cap plate 3 and the plate terminals 412 and 422.

The vent hole 32 may be formed to penetrate the negative electrode terminal 41 and the cap plate 30 corresponding to the negative electrode terminal 41. The vent hole 32 may be air-tightly sealed by the vent plate 34. The vent hole 32 may discharge internal gas generated by charging and discharging to the outside of the rechargeable battery 100 so as to prevent an explosion of the rechargeable battery 100. When the internal pressure of the rechargeable battery 100 reaches a predetermined level, the vent plate 34 may be ruptured. A notch (not shown) may be formed in the vent plate 34 to induce a rupture of the vent plate 34. When the vent hole 32 is open due to the rupture of the vent plate 34, the internal gas of the rechargeable battery 100 may be discharged to the outside.

In the present exemplary embodiment, the vent hole 32 and the vent plate 34 may be exemplarily provided in the negative electrode terminal 41. However, in another implementation, the vent hole and the vent plate may be provided in the positive electrode terminal (not shown).

Figure 5:
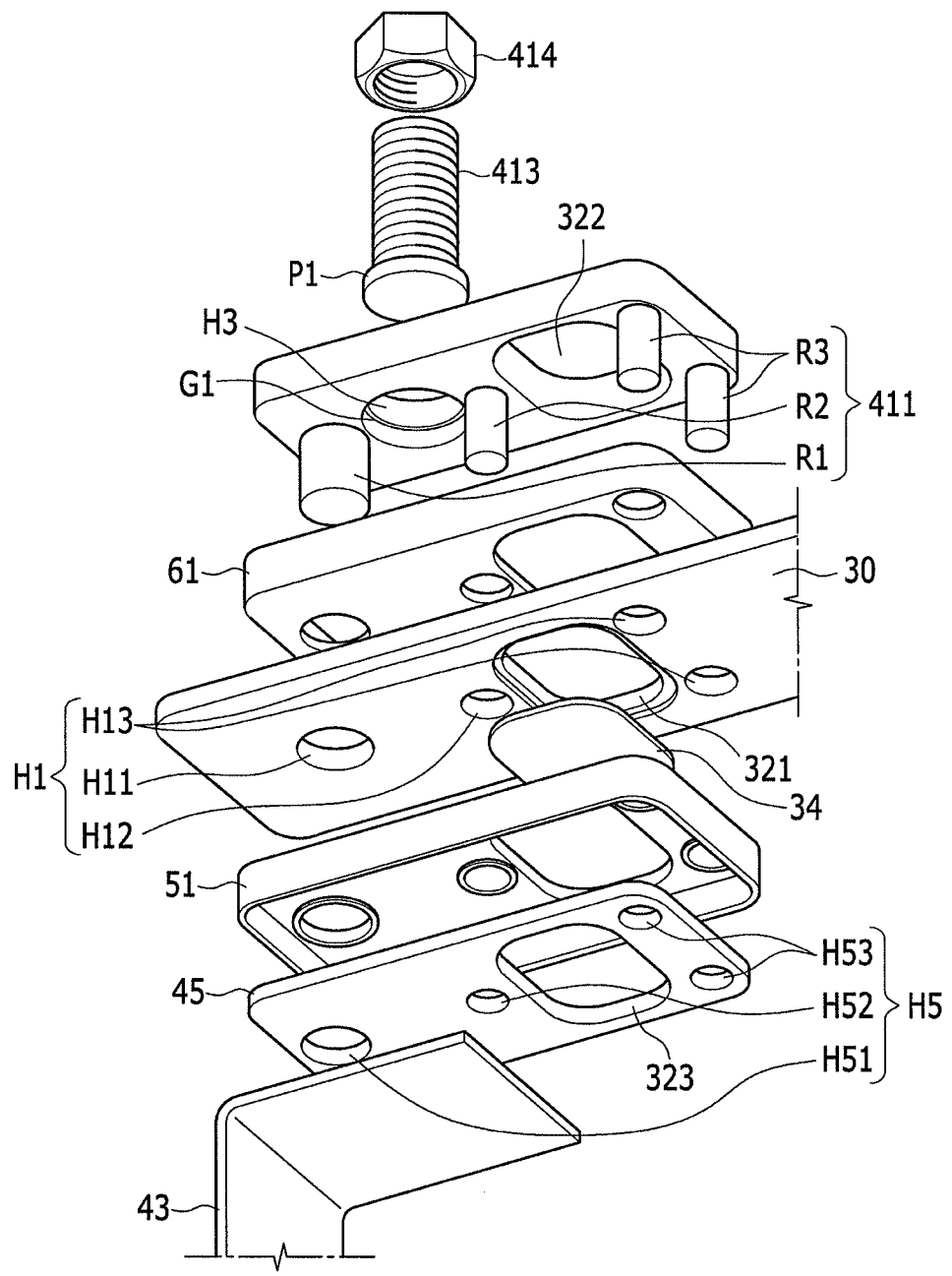
FIG. 5 illustrates an exploded perspective view of FIG. 3.

FIG. 5 is an exploded perspective view of FIG. 3. Referring to FIG. 3 and FIG. 5, the negative electrode terminal 41, the vent hole 32, and the vent plate 34 will be described in further detail. The configuration of the positive electrode terminal 42 may be similar to or the same in some aspects as the configuration of the negative electrode terminal 41. Accordingly, the description of such similar aspects in the configuration of the positive electrode terminal 42 will be not be repeated.

A plurality of the terminal holes H1 (H11, H12, and H14) may be provided in the cap plate 30 for installation of the negative electrode terminal 41 in the cap plate 30. A plurality of the rivet hole H5 (H51, H52, and H53) may be provided in the support plate 45 to correspond to the terminal holes H1 (H11, H12, and H13).

The rivet terminal 411 may include first, second, and third rivets R1, R2, and R3. The first rivet R1 is inserted into the terminal hole H11 provided in the cap plate 3 corresponding to one side of the plate terminal 412 in a first direction (x-axis direction) of the cap plate 30 among the terminal holes H1, and may be electrically and mechanically connected to the support plate 45 by being inserted into the rivet hole H51 of the support plate 45 and being caulked at the end portion thereof.

The second rivet R2 may be spaced apart from the first rivet R1 and inserted into the terminal hole H12 provided in the cap plate 30 corresponding to a middle portion of the plate terminal 412 in the first direction (x-axis direction) of the cap plate 30, and may be electrically and mechanically connected to the support plate 45 by being inserted into the rivet hole H52 of the support plate 45 and being caulked at the end portion thereof.

The third rivet R3 may be spaced apart from the second rivet R2 and inserted into the terminal hole H13 provided in the cap plate 30 corresponding to the other end of the plate terminal 412 in the first direction (x-axis direction) of the cap plate 30, and may be electrically and mechanically connected to the support plate 45 by being inserted into the rivet hole H53 of the support plate 45 and by being caulked at the end portion thereof.

A diameter D11 of the first rivet R1 may be larger than diameters D12 and D12 of the second and third rivets R2 and R3. The first rivet R1 may minimize resistance so as to allow electric current to flow between the plate terminal 412 and the negative electrode lead tab 43.

The bolt terminal 413 may be disposed in the plate terminal 412 corresponding to a region between the first rivet R1 and the second rivet R2. Thus, the second rivet R2 and the first rivet R1 may stably fix the bolt terminal 314 to the external surface of the cap plate 30 while pressing the insulators 61 and 62 and the gaskets 51 and 52 disposed between the second rivet R2 and the first rivet R1, and may stably fix the support plate 45 to the internal surface of the cap plate 30. There may be one first rivet R1 and one second rivet R2.

The vent hole 32 may be disposed in the plate terminal 412 corresponding to a region between the second rivet R2 and the third rivet R3. Thus, the second rivet R2 and the third rivet R3 may stably seal the vent hole 32 by the gasket 51 and the insulator 61. There may be two third rivets R3. The two third rivets R3 may be distanced from each other in a second direction (y-axis direction) that crosses the first direction (x-axis direction) of the cap plate 30 to further improve sealing of the vent hole 32.

The vent hole 32 may include a first vent hole 321 and a second vent hole 322 connected with each other in a third direction (z-axis direction) that is perpendicular to the first and second directions. The first vent hole 321 may be formed in the cap plate 30, and the second vent hole 322 may be formed in the plate terminal 412 of the negative electrode 41 and thus connected with the first vent hole 321 in the z-axis direction.

Further, when the support plate 45 is provided, the vent hole 32 may further include a third vent hole 232 formed in the support plate 45. The third vent hole 323 may be connected with the first vent hole 321 in the z-axis direction.

As shown in the drawing, when the support plate 45 is provided, the vent plate 34 may be welded to a groove G3 formed in the external circumference of the first vent hole 321 between the first vent hole 321 and the third vent hole 323 to control connection between the first vent hole 321 and the third vent hole 323.

Further, when the support plate is not provided, the vent plate may be welded to the first vent hole in the internal surface of the cap plate (not shown).

The support plate 45 may be pulled by the second and third rivets R2 and R3 toward the cap plate 30 to press the gasket 51. Thus, the gasket 51 supported by the support plate 45 may improve sealing between the vent plate 34 and the groove G3.

In addition, the first, second, and third rivets R1, R2, and R3 may exert force that pulls the support plate 45 toward the cap plate 30. Accordingly, the support plate 45, the terminal plate 412, and the cap plate 30 may be integrated.

The cap plate 30 may have strong mechanical strength by being supported by the plate terminal 412 and the support plate 45 even with the first vent hole 321 and the terminal hole H1 being formed in the cap plate 30. Accordingly, the cap plate 30, the electrode assembly, and cells of the rechargeable battery 100 may be stable in dimension.

A diameter D21 of the first vent hole 321 may be smaller than a diameter D2 of the third vent hole 323. The vent plate 34 disposed between the first and third vent holes 321 and 323 may be rigidly supported by the support plate 45, interposing the gasket 51 therebetween.

In addition, the diameter D21 of the first vent hole 321 may be smaller than a diameter D22 of the second vent hole 322. Thus, an exhaust pipe 71 may be inserted into the second vent hole 322 to allow internal gas to be discharged to the outside. The second vent hole 322 may enable the exhaust pipe 71 to be connected such that degrees of freedom in design of a discharge path of the internal gas may be increased.

Figure 6:
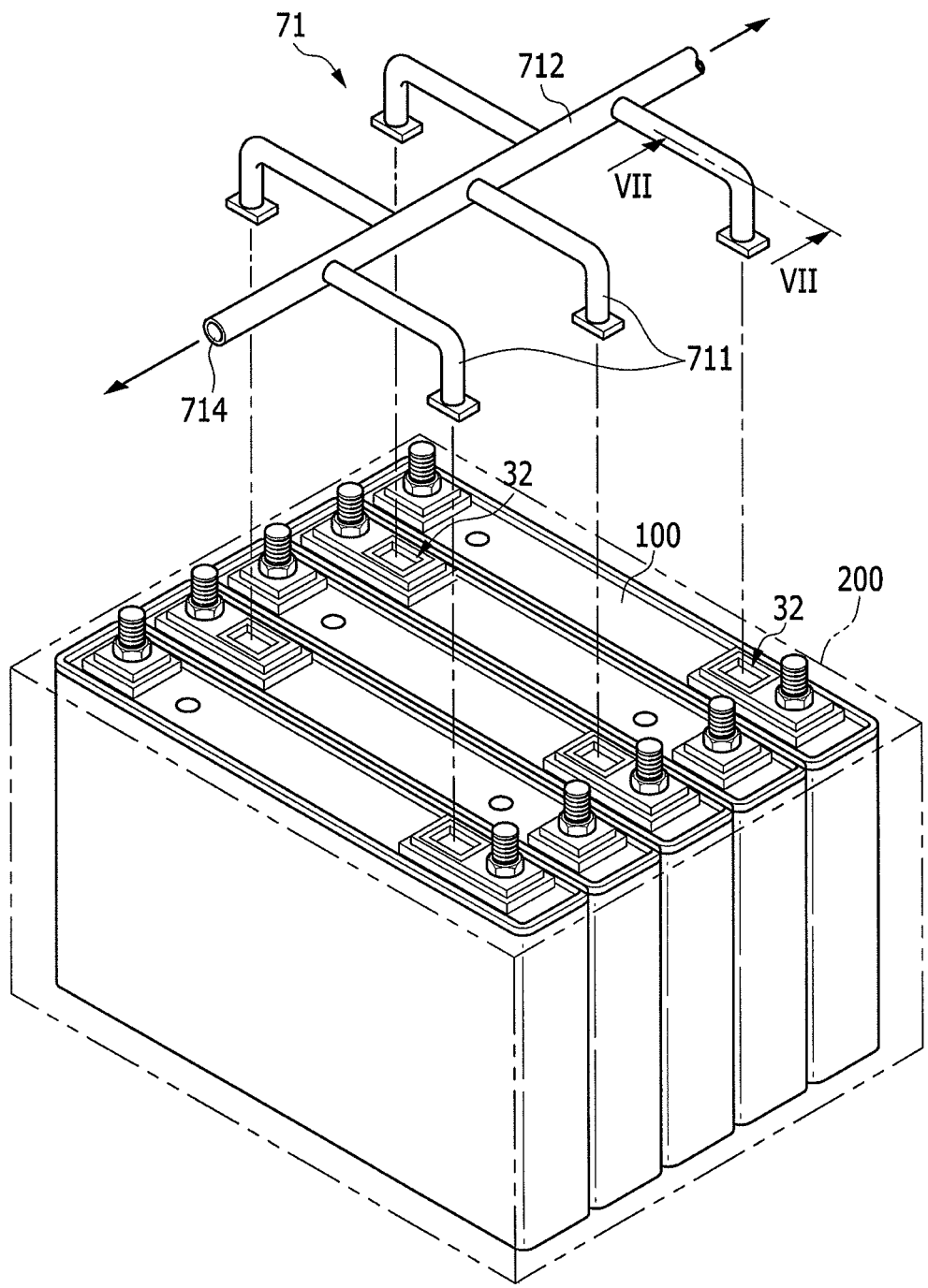
FIG. 6 illustrates a perspective view of a battery module to which the rechargeable battery of FIG. 1 is applied.

FIG. 6 is a perspective view of a battery module to which the rechargeable battery 100 of FIG. 1 is applied. Referring to FIG. 6, a battery module may include a housing 200 that accommodates a plurality of electrically connected rechargeable batteries 100, which may be the same as rechargeable batteries 100 described above, and an exhaust pipe 71 connected to the vent holes 32 of the rechargeable batteries 100 received in the housing 200.

The exhaust pipe 71 may include a plurality of sub-exhaust pipes 711 respectively connected to the vent holes 32 of the rechargeable batteries 100 and a main exhaust pipe 712 connecting the sub-exhaust pipes 711. Internal gas discharged from each sub-exhaust pipe 711 may be discharged through the main exhaust pipe 712.

Figure 7:
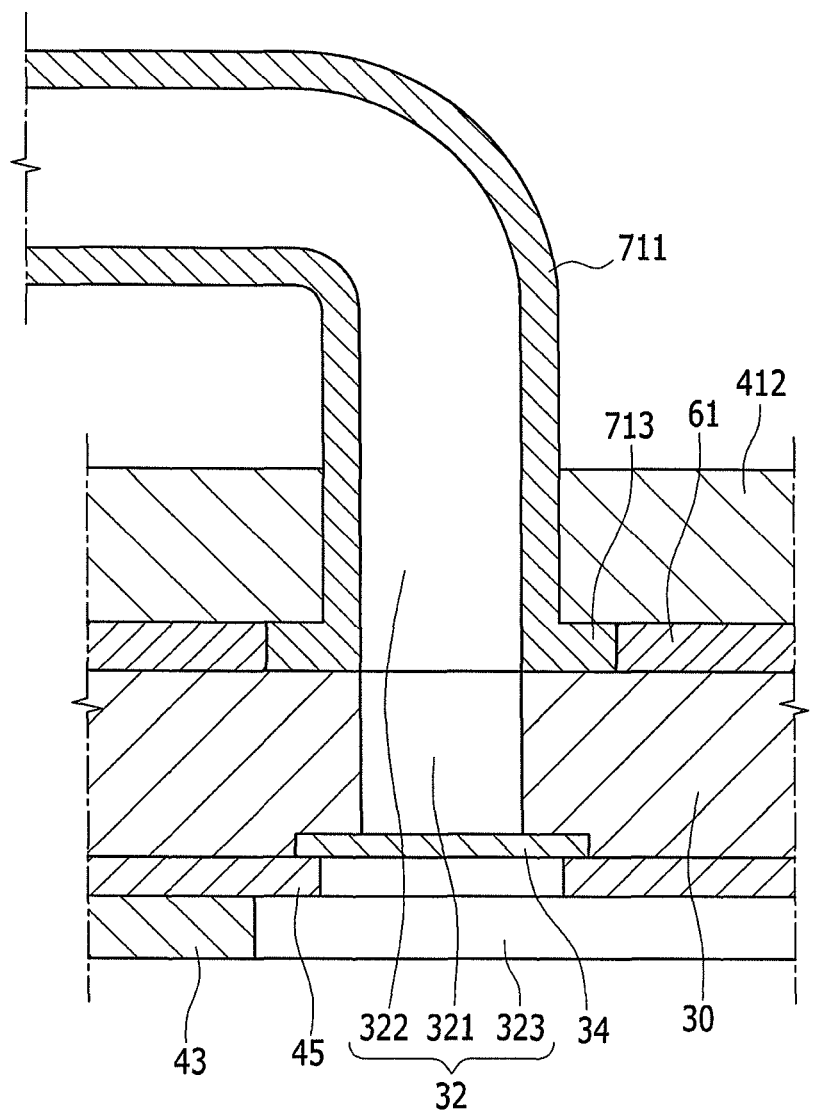
FIG. 7 illustrates a cross-sectional view of FIG. 6, taken along the line VII-VII.

FIG. 7 is a cross-sectional view of FIG. 6, taken along the line VII-VII. Referring to FIG. 7, each sub-exhaust pipe 711 may include a protrusion 713 at an end thereof. The protrusion 713 may be pressingly supported by the cap plate 30 and the plate terminal 412 outside of the first vent hole 321. The thickness of the protrusion 713 may be the same as that of the insulator 61 so the protrusion 713 and the insulator 61 may provide an air-tight seal between the cap plate 30 and the plate terminal 412.

For example, the exhaust pipe 71 may be formed of one of rubber, a synthetic resin, and metal. That is, the sub-exhaust pipe 711 may be formed of a material that has elasticity or that can be deformed depending on a fastening force between the cap plate 30 and the plate terminal 412.

The main exhaust pipe 712 may include an opening 714 at at least one end, and the opening 714 may be disposed away from the outermost portion of the housing 200. Thus, the main exhaust pipe 712 may discharge harmful gas generated from electrolyte solution or internal gas to the outside of the housing 20 through the opening 714. That is, contamination of the periphery of the vent hole 32 and the battery module due to the discharge of the internal gas may be prevented.

By way of summation and review, a cap plate of a rechargeable battery may be provided with a vent hole discharging internal gas generated from the inside of the case due to charging and discharging to the outside. The vent hole is sealed by the vent plate, and discharges the internal gas when the vent plate is ruptured due to increase of internal pressure, thereby preventing explosion of the rechargeable battery.

If the vent hole is independently formed in the center portion of the cap plate, a dimension instability of the cap plate assembly formed by coupling the electrode terminals to the cap plate and cells formed by assembling the cap plate assembly to the case may occur, the strength of the cap plate may be weakened, design in a gas discharge path may be restricted, and sealing of the vent plate may be complicated.

An exemplary embodiment provides a rechargeable battery that can improve dimension stability of a cap plate, a cap plate assembly, and cells.

The exemplary embodiments described herein advance the art by providing a rechargeable battery that may assure strength of a cap plate and may improve sealing of a vent hole. In more detail, the strength of the cap plate may be assured by forming the vent hole through portions of the electrode terminals coupled to each other and through the cap plate so that the dimension stability of the cap plate, the cap plate assembly, and the cells can be improved and the sealing of the vent hole can be improved.

The rechargeable battery according to the exemplary embodiment may assure freedom in design of a discharge path of an internal gas when a vent plate is ruptured and may prevent contamination of the periphery of the vent hole due to the discharge of the internal gas.

Further, another exemplary embodiment provides a battery module including the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery comprising:
   an electrode assembly including electrodes on both sides of a separator;
   a case accommodating the electrode assembly;
   a cap plate coupled to an opening of the case;
   an electrode terminal assembled to a plurality of terminal holes in the cap plate;
   an insulator between the electrode terminal and a first surface of the cap plate;
   a gasket between the electrode terminal and a second surface of the cap plate; and
   a lead tab at one side of the gasket to connect the electrode terminal to the electrode assembly,
   wherein:
   the electrode terminal includes a plate terminal at an outer surface of the insulator and a rivet terminal connected to the plate terminal and connected to the lead tab through the terminal holes,
   the terminal holes include, in a first direction of the cap plate:
      a first terminal hole in the cap plate corresponding to a first side portion of the plate terminal,
      a second terminal hole in the cap plate corresponding to a center portion of the plate terminal, and
      a third terminal hole corresponding to second side portion of the plate terminal on an opposite side of the plate terminal from the first side portion,
   the rivet terminal includes:
      a first rivet inserted to the first terminal hole;
      a second rivet separated from the first rivet and inserted to the second terminal hole; and
      a third rivet separated from the second rivet and inserted to the third terminal hole,
   the electrode terminal and the cap plate include a vent hole that penetrates the electrode terminal and the cap plate, and
   the vent hole is sealed by a vent plate.

2. The rechargeable battery as claimed in claim 1, wherein the electrode terminal further includes a bolt terminal passing through a bolt hole of the plate terminal and having a protrusion at an outer side of the bolt terminal, the bolt terminal being coupled to a groove formed in the plate terminal corresponding to the protrusion such that the bolt terminal is supported by the insulator, the insulator being between the bolt terminal and the cap plate.

3. The rechargeable battery as claimed in claim 2, further comprising a support plate between the gasket and the lead tab.

4. The rechargeable battery as claimed in claim 3, wherein: the support plate includes a plurality of rivet holes corresponding to the terminal holes.

5. The rechargeable battery as claimed in claim 2, wherein the bolt terminal is disposed between the first rivet and the second rivet.

6. The rechargeable battery as claimed in claim 1, wherein the vent hole is disposed between the second rivet and the third rivet.

7. The rechargeable battery as claimed in claim 1, wherein a diameter of the first rivet is larger than diameters of the second and third rivets.

8. The rechargeable battery as claimed in claim 1, wherein:
   the first rivet and the second rivet are singular rivets, and
   the third rivet includes two third rivets separated in a second direction that crosses the first direction of the cap plate.

9. The rechargeable battery as claimed in claim 1, wherein the vent hole includes a first vent hole in the cap plate and a second vent hole in the electrode terminal and connected to the first vent hole.

10. The rechargeable battery as claimed in claim 9, further including a support plate between the gasket and the lead tab,
    wherein the vent hole further includes a third vent hole formed in the support plate and connected to the first vent hole.

11. The rechargeable battery as claimed in claim 10, wherein the vent plate is welded to a groove located in an external circumference of the first vent hole between the first and third vent holes to control a connection between the first vent hole and the third vent hole.

12. The rechargeable battery as claimed in claim 11, wherein a diameter of the first vent hole is smaller than a diameter of the second vent hole.

13. The rechargeable battery as claimed in claim 11, wherein:
    a diameter of the first vent hole is smaller than a diameter of the third vent hole, and
    the vent plate is supported by the support plate, the gasket being interposed therebetween.

14. The rechargeable battery as claimed in claim 11, further comprising an exhaust pipe inserted to the second vent hole.

15. The rechargeable battery as claimed in claim 14, wherein:
    the exhaust pipe includes a protrusion at an end thereof, and
    the protrusion is supported by the cap plate and the plate terminal in an outer side of the first vent hole.

16. The rechargeable battery as claimed in claim 14, wherein the exhaust pipe is formed of at least one of rubber, a synthetic resin, and metal.

* * * * *